April 5, 1955      G. RUSSO      2,705,538
PROPELLER WITH FEATHERING BLADES
Filed May 4, 1950
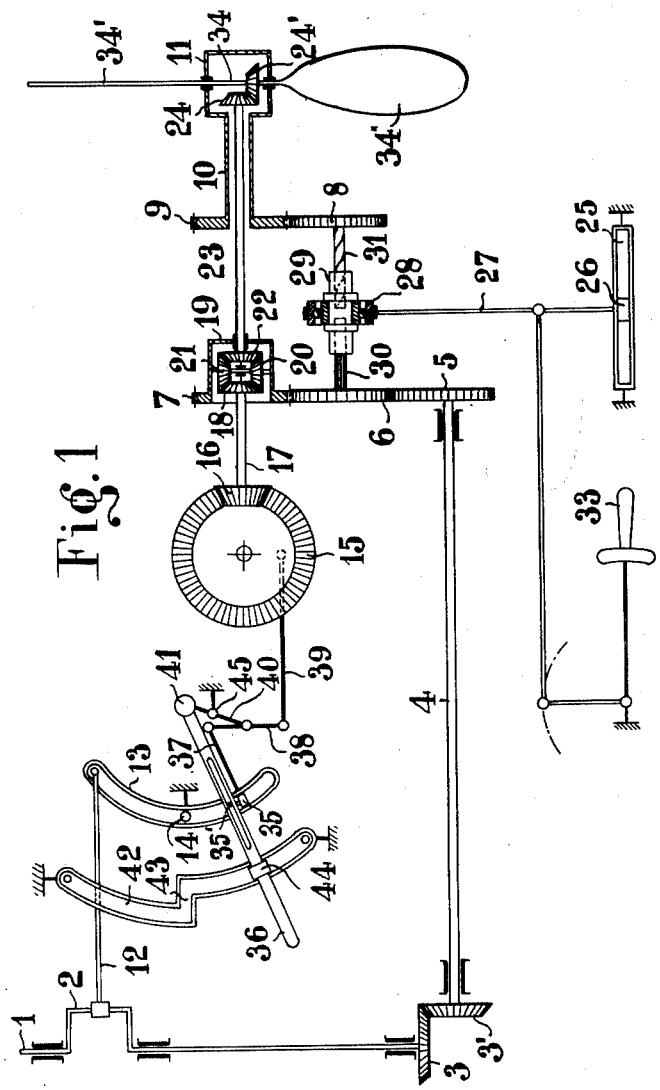
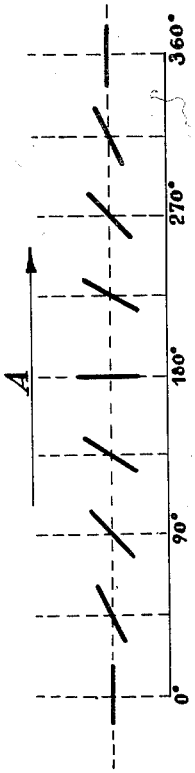
INVENTOR:
Giovanni Russo
BY
ATTORNESS

United States Patent Office 2,705,538
Patented Apr. 5, 1955

2,705,538

PROPELLER WITH FEATHERING BLADES

Giovanni Russo, Rome, Italy

Application May 4, 1950, Serial No. 159,891

3 Claims. (Cl. 170—160.25)

This invention relates to propellers whose angle of incidence may be varied continuously.

Sea and air screw propellers wherein the angle of incidence of the blades can be varied during rotation are well known and are commonly used in order to vary the speed of the sea or air-craft according to the number of revolutions of the engine or to attain braking or reversing effects.

According to the present invention there is provided a propeller which is adapted to produce both lifting and driving forces, wherein the blades are mounted radially around a hollow boss and are connected with a bevel gear of an epicyclic train mounted within the boss, so that the angle of incidence of the blades is constant when the bevel gear revolves at the same rate as the boss, but wherein means are provided to vary continuously the angular displacement of said bevel gear relative to the boss so that the angle of incidence of the blades may be varied continuously as the propeller rotates.

The invention will be more easily understood from the following description read in conjunction with the accompanying drawing wherein a constructional form of the invention is shown by way of example.

In the drawings:

Figure 1 shows schematically the devices for the transmission and the control of motion of the propeller boss and of the variation of the angle of incidence of the blades; and Figure 2 represents the development of a blade revolution with the variation of the angle of incidence thereof, according to a particular case of practical application of the device.

Referring to the figures, it may be seen that a shaft 4, which may be operated by any suitable mechanism, is here shown as driven by a crank-shaft 1 and bevel gears 3—3'. Gear 3', in turn, sets in motion, through shaft 4 the toothed wheels 5 and 6, and through shafts 30 and 31, the gear wheels 8 and 9, the latter being keyed on a hollow shaft 10 which is welded to the box 11.

By means of connecting rod 12, crank shaft 1 causes a link 13 to pivot around a fixed point 14 and through the levers shown in Figure 1, the function of which will be described hereinafter, imparts reciprocal rotation to a spur bevel wheel 15 which, in turn, through pinion 16 and shaft 17, rotates a bevel gear 18 which forms part of a differential gear in the box 19 welded to the gear wheel 7.

Bevel gears 20 and 21, which are mounted on the same axis and form part of the differential gear contained within the box 19, set into motion bevel gear 22 keyed to shaft 23. The latter, by passing through hollow shaft 10, rotates the bevel pinion 24 which together with bevel pinion 24' forms an epicyclic train contained in box 11.

A shoe 26 is slidably mounted within a fixed guide block 25 and is connected, by means of a rod 27 to a ball bearing 28, or to a bearing of any known type which is, in turn, slidable along its own axis together with sleeve 29. Inside sleeve 29 there are fitted two grooved axles 30 and 31, of which one has longitudinal grooves and the other spiral grooves, or both may have spiral grooves of different pitch.

Grooves are also provided at the interior of sleeve 29 so that when it is displaced to the right or to the left by means of lever 33, toothed wheel 6 and gear wheel 8 will be angularly displaced with respect to each other. The same angular displacement will also be given to gear wheel 9 and box 11 with the result that bevel pinion 24' will rotate imparting an angular displacement also to propeller shaft 34.

By reconsidering now the levers system which transmits reciprocal angular movements to spur bevel wheel 15, it is pointed out that link 13 is provided with a groove within which a shoe 35 is slidable and is connected to a control lever 36 by means of a hinged joint 35', which is free to slide within a longitudinal slot provided in lever 36.

A connecting rod 37 joins shoe 35 to the end of a balancing lever 38, the other end of which is hinged to a connecting rod 39. The connecting rod 39 serves to impart reciprocal angular displacements to spur bevel wheel 15, as previously described.

The fulcrum of balancing lever 38 is hinged to the end of another lever 40 the fulcrum of which is fixed at point 45, whilst its other end is hinged to the end 41 of control lever 36.

For the sake of clearness connecting rod 37 is shown beside control lever 36 in the drawing, but in practice it is arranged below this lever, on a plane parallel to the plane of the drawing.

A fixed guide 42 is situated beside link 13 and is divided into two zones shaped as arcuated segments by means of a transversal segment 43 in alignment with fulcrum points 14 and 41. The centres of curvature of the two portions of guide 42 also lie on the same line.

Shoe 44 is slidable within a slot of guide 42, so that shoes 35 and 44 are connected to each other by means of the same control lever 36 and always in alignment with point 41.

When shoe 44 is in the same position as segment 43 and consequently shoe 35 is above fulcrum point 14, the whole system 37—38—39—40 as well as spur bevel wheel 15 and pinion 16 will remain stationary.

If, under these conditions control lever 36 is moved and shoe 44 is caused to slide along segment 43, the lever 40 pivots around fixed pivot point 45 thus displacing balancing levers 38 and connecting rod 39, so that the spur bevel wheel 15 is turned by an amount corresponding to the amplitude of the displacement of connecting rod 39.

The rotation of spur bevel wheel 15 turns pinion 16 and sets into rotation propeller shaft 34 through the device described herebefore. The ratio of the number of teeth between spur bevel wheel 15 and pinion 16 has been selected in such a manner that, while the shoe 44 moves along the transversal segment 43 of the fixed guide 42, the shaft 23 rotates bevel pinions 24 and 24', thus causing a 90° angular rotation of the propeller shaft 34.

Suppose that crank shaft 1 be turning, bevel gears 3—3' will rotate together with shaft 4 and toothed wheels 5 and 6, and gear wheel 7. Wheel 6, by means of two axles 30 and 31 and sleeve 29 will rotate gear wheels 8 and 9, box 11 and propeller shaft 34. Moreover box 19, welded to gear wheel 7, will also rotate together with bevel gears 18, 20, 21, and 22 and bevel gear 22 sets in motion bevel pinion 24'.

Wheels 5—6—7—8—9 have the same number of teeth as bevel gears 3—3', so that boxes 11 and 19 will accomplish the same number of revolutions as the crank 2 of crank shaft 1.

Assuming that control lever 36 is in a centre position, that is shoe 35 is at point 14 and shoe 44 in the same position as 43. When the lever 36 is in the dead center position, such position affects the motion of levers 37, 38 and 40 but does not affect the motion of the lever 13 which is connected to the crank 2 by the lever 12.

Since box 19 is rotating, bevel gears 20 and 21 will turn about bevel gear 18 which is stationary and will rotate bevel gear 22, shaft 23 and bevel pinion 24.

As bevel gears 18, 20, and 21, and bevel pinions 24 and 24' all have the same number of teeth, pinion 24 accomplishes the same number of revolutions as box 11 and in the same direction, consequently bevel pinion 24' does not impart to propeller shaft 34 any angular displacement.

If, under the same conditions, that is with control shoe 35 in a centre position, shoe 44 slides along segment 43, propeller shaft 34 will accomplish a 90° angular displacement around itself, such displacement remaining unvaried during the rotation of box 11 around shaft 23.

By displacing lever 36 from said centre position, the lever system 38 and 40 and the connecting rod 39 rotate spur bevel wheel 15, and propeller shaft 34 will accomplish angular displacements around the axis thereof, as frequent as the oscillations of link 13.

The leverage and the diameter of the gear wheels can be proportioned in such a way as to obtain a complete revolution of propeller shaft 34 around its own axis for every turn of box 11 of any angle from 0° to 360°. It would also be possible for propeller shaft 34 to accomplish a 360° revolution for every outward stroke of link 13 and another complete revolution for every return stroke. In other words for every complete revolution of crank-shaft 1, propeller shaft 34 will accomplish two 360° revolutions in the same direction.

By suitably shaping link 13 and guide 42, it is possible to obtain for every turn of box 11, and for any angle of rotation of propeller shaft 34, a ratio of variations reciprocal or pulsative, symmetrical or asymmetrical.

It will be well understood that by arranging lever 36 on opposite branches of link 13 and guide 42, the motion of propeller shaft 34 will be reversed, whereas box 11 will continue to rotate in the same direction.

If during the motion of the mechanism, lever 36 is pushed towards an end of guide 42 and lever 33 towards an end of its own stroke, sleeve 29 is displaced towards toothed wheel 6 or towards gear wheel 8.

Box 11, as set forth herebefore, accomplishes an angular displacement in the same direction as that of its rotation or else in the opposite direction, so that the beginning of the rotation of propeller shaft 34 about its own axis may be displaced so as to coincide with any point of the revolution of box 11.

When the driving shaft is rotating and levers 33–36 are in a center position, and shoe 35 is in the same position as fulcrum 14 and sleeve 29 in the middle between toothed wheels 6 and 8, and assuming that a screw blade 34' is fixed to one end of propeller shaft 34 and another blade 34'' is fixed to the opposite end of the same shaft 34 in like manner, with the plane of blade 34' substantially perpendicular to that of blade 34'' a driving propeller of which box 11 is the boss is provided.

If lever 36 is displaced in such a way as to cause shoe 44 to travel the whole of the transversal segment 43, the blades of the screw will accomplish, as said before, a 90° revolution around their own axis, and the incidence will become negative thus reversing the direction of the propulsory action of the blades.

Let us now suppose link 13 to be at the middle of its return stroke and sleeve 29 to be in a symmetrical position between wheels 6 and 8.

Let us also suppose blades 34'—34'' to be in a vertical position. By displacing lever 36 along a branch of link 13 as far as a point where, for every complete stroke of said link the screw accomplishes a 90° revolution about propeller shaft 34, boss 11 will turn through 90°, thus carrying propeller shaft 34 into a horizontal position and accomplish the last part of its stroke, causing propeller shaft 34 to turn through 45° around its own axis.

The complete oscillation period of link 13 around point 14 and the complete period of reciprocal rotation of the screw blade round propeller shaft 34 commences from this moment.

By developing the circular trajectory described by the end of a blade on a plane and referring to the positions thereof as they can be seen by an observer situated on the plane described by propeller shaft 34 and turning with the same blade, the ratios between the angles of rotation of the screw boss and the angle of incidence of the blades will be as follows:

| Rotation of the screw boss: | Angle of incidence |
|---|---|
| 0° | 0° |
| 45° | 22.5° |
| 90° | 45° |
| 135° | 67.5° |
| 180° | 90° |
| 225° | 67.5° |
| 270° | 45° |
| 315° | 22.5° |
| 360° | 0° |

That is, the incidence of every blade at the beginning of the outward stroke of link 13 is 0°, at the middle of the stroke it is 45° and at the end thereof 90°, being again 45° at the middle of the return stroke and 0° at the end thereof. Consequently at the beginning of the revolution every screw blade is ineffective during the first half of the revolution of screw boss 11, the positive incidence gradually increases up to a maximum of 90° in which position the whole power applied to the screw is transformed into a vertical thrust. During the second half of the revolution, the angle of incidence gradually decreases so that at the end of such revolution the angle of incidence will again be 0°.

If the displacement of lever 36 increases or diminishes the angular displacement of the screw blades varies correspondngly.

If sleeve 29 is displaced from its centre position by operating lever 33 and is carried towards one or other of wheels 6 or 8, the starting point 0° of Figure 2 will be displaced towards another point of the circumference, whereas the cycle of reciprocal revolutions of the blades around propeller shaft 34 will remain unvaried.

From the above description is appears evident that by properly proportioning the transmission, distribution and control devices it will be possible to obtain variations either of value and direction of the forces of total reaction of the blades within the widest limits.

What is claimed is:

1. A propeller in combination with the crank shaft of an engine; the improvements comprising a boss, a hollow shaft disposed on the boss and communicating therewith and extended inwardly toward the crank shaft, a gear wheel keyed to the free end of the hollow shaft, a propeller shaft rotatably disposed in the boss at 90° to the hollow shaft and extended through the boss, and a blade keyed longitudinally on each extended end of the propeller shaft, the blades being in planes at 90° relative to each other; the propeller further comprising a bevel pinion keyed to the propeller shaft within the boss, a third shaft rotatably disposed through the hollow shaft and extended into the boss, a second bevel pinion keyed to the end of the third mentioned shaft within the boss in operable engagement with the first mentioned beveled pinion, a differential gear for the free end of the third mentioned shaft, a box disposed around the differential gear, a second gear wheel keyed to the box, the differential gear having two opposed pairs of coacting beveled gears, said beveled gears and the first and second mentioned pinions having the same number of teeth, the free end of the third mentioned shaft being rotatably inserted in the box and one of the differential beveled gears being keyed to the inserted end of the third mentioned shaft; the propeller further comprising a fourth shaft rotatably inserted in the box, the differential bevel gear opposite the differential bevel gear of the third mentioned shaft being keyed to the fourth shaft, means in operable engagement with the crankshaft for imparting a variable oscillatory movement to the differential gear, and gear and shaft means interconnecting the first and second mentioned gear wheels in operable engagement with the crankshaft for rotating the propeller shaft.

2. A propeller according to claim 1 in which the means in operable engagement with the crankshaft for imparting a variable oscillatory movement to the differential gears comprises a rotatably mounted spur bevel wheel, a pinion in operable engagement with the spur bevel wheel, means for keying the pinion to one end of the fourth mentioned shaft, the oscillatory movement means further comprising a connecting rod, means for pivotally connecting one end of the connecting rod to the spur bevel wheel, a balancing lever in operable engagement with the free end of the connecting rod, a lever arm coacting with the balancing lever, the lever arm having a fixed fulcrum and a power arm, a control lever coacting with the power arm, a second connecting rod pivotally disposed on the free end of the balancing lever, an arcuate link coacting with the control lever and the second mentioned connecting rod, the link having an arcuate groove formed therein and one end of the link being connected through a third connecting rod with the crankshaft, means for pivoting the link about a fixed point substantially at the center of the arcuate slot; a shoe slidable in the groove, means slidable in the control lever for pivotally connecting the shoe to the free end of the second mentioned connecting rod; the oscillatory movement means further comprising a fixed arcuate guide coacting with the free end of the control lever, the guide being divided into two arcuate segments connected one with the other by means of a transversal segment aligned with the fixed pivotal connecting means of the arcuate link in a point which constitutes the common center of both the link and the guide, and a second shoe disposed on the free end of the control lever and slidable in the guide.

3. A propeller according to claim 1 in which the gear and shaft means intermediate the first and second mentioned gear wheels in operable engagement with the crank shaft for rotating the propeller shaft comprises a toothed wheel in operable engagement with the second mentioned gear wheel, said toothed wheel being keyed to one end of a longitudinally grooved axle having at its opposite end a second axle aligned with the first axle and provided with spiral grooves, the near ends of the two axles being separated, a sleeve disposed on the two axles and engaged with the grooves thereof, a third gear wheel keyed to the free end of the second mentioned axle and in operable engagement with the first mentioned gear wheel, means for longitudinally moving the sleeve on the two axles, said means being adapted to obtain angular displacement between the hollow shaft and the third mentioned shaft when changing the initial point of the revolving oscillatory movement of the second mentioned shaft in the boss while being rotated by the hollow shaft, and gear and shaft means interconnecting the toothed wheel and the crank shaft for rotating the boss and the box at the angular velocity of the crank shaft.

References Cited in the file of this patent

UNITED STATES PATENTS

| | | |
|---|---|---|
| 649,781 | Voltor | May 15, 1900 |
| 1,349,724 | Johnson | Aug. 17, 1920 |
| 1,900,689 | Baum | Mar. 7, 1933 |
| 2,032,790 | Brown | Mar. 3, 1936 |

FOREIGN PATENTS

| | | |
|---|---|---|
| 369,658 | France | Jan. 17, 1907 |
| 427,430 | France | May 27, 1911 |
| 148,596 | Great Britain | July 20, 1920 |
| 107,560 | Australia | May 26, 1939 |
| 862,210 | France | Nov. 30, 1940 |